United States Patent
Barr et al.

(10) Patent No.: US 7,209,864 B1
(45) Date of Patent: Apr. 24, 2007

(54) METHOD FOR COLLECTING AND REDUCING PERFORMANCE-RELATED DATA IN CONSTRAINED ENVIRONMENTS

(75) Inventors: Terrence Barr, Freiburg (DE); David Proulx, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 10/939,195

(22) Filed: Sep. 9, 2004

(51) Int. Cl.
*G06F 11/30* (2006.01)

(52) U.S. Cl. .................................. 702/186; 717/124
(58) Field of Classification Search ............. 702/186; 717/124
See application file for complete search history.

(56) References Cited

U.S. PATENT DOCUMENTS

| | | | | |
|---|---|---|---|---|
| 5,233,545 A | * | 8/1993 | Ho et al. | 702/180 |
| 5,715,372 A | * | 2/1998 | Meyers et al. | 706/16 |
| 6,434,364 B1 | * | 8/2002 | O'Riordain | 455/67.11 |
| 6,571,186 B1 | * | 5/2003 | Ward | 702/74 |
| 6,754,854 B2 | * | 6/2004 | Kurrasch | 714/47 |
| 2003/0100299 A1 | * | 5/2003 | Ko et al. | 455/423 |

OTHER PUBLICATIONS

Gottesman, E., "*Relating User Perception of Performance to Measurable System Parameters*", SunSoft TechConf 2001, pp. 1-14.
Sun Microsystems, Inc., "*Using Latency to Infer User Perception of Performance*", Apr. 2002, pp. 1-29.
Sun Microsystems, Inc., "*Latency and User Perception*", May 2002, pp. 1-39.

* cited by examiner

*Primary Examiner*—Marc S. Hoff
*Assistant Examiner*—Janet L Suglo
(74) *Attorney, Agent, or Firm*—Martine Penilla & Gencarella, LLP

(57) ABSTRACT

A method for testing performance of a constrained resources computing device (CRCD) is provided which includes determining that a data sample was generated and generating a time stamp corresponding to when the data sample was generated. The method also includes determining a defined time interval corresponding to the time stamp and incrementing a counter associated with the defined time interval corresponding to the time stamp.

13 Claims, 6 Drawing Sheets

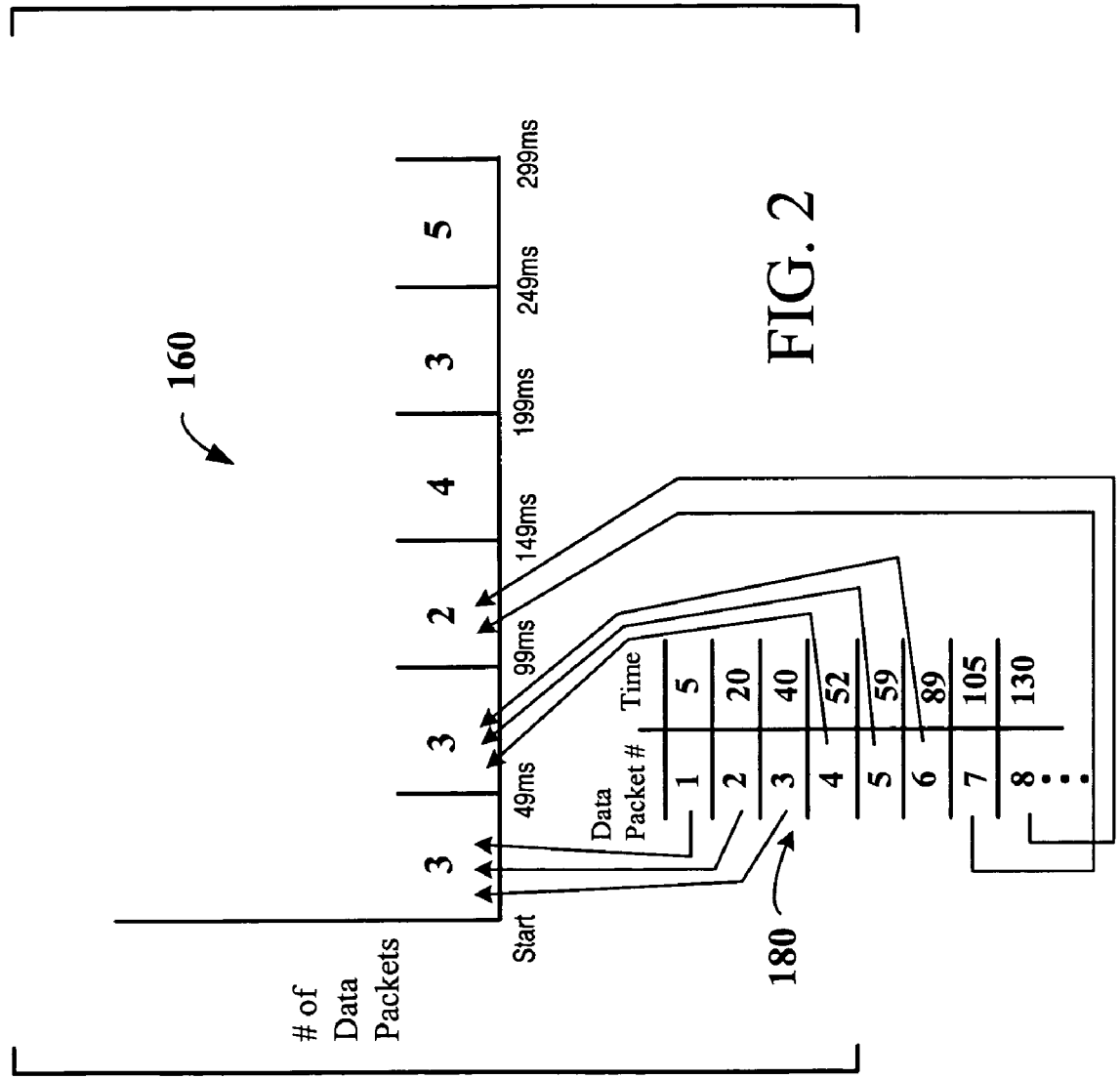

METHOD FOR COLLECTING AND REDUCING PERFORMANCE-RELATED DATA IN CONSTRAINED ENVIRONMENTS

CROSS REFERENCE TO RELATED APPLICATIONS

This application is related to U.S. patent application Ser. No. 10/939,196, filed on Sep. 9, 2004, and entitled "METHOD FOR INSTRUMENTATION-FREE MEASUREMENT OF USER INPUT EVENT PROCESSING TIME," which is incorporated herein by reference.

BACKGROUND OF THE INVENTION

1. Field of the Invention

The present invention relates to computing devices, and more specifically to obtaining performance-related data in a constrained computing environment.

2. Description of the Related Art

Performance analysis typically requires collecting and processing real-time performance-related data. For measurements with a high degree of accuracy, the amount of data involved can exceed the processing and storage capabilities of constrained devices.

The experience a user has when interacting with a computing device is determined by many factors, such as factors related to software functionality, user interface design, device and software performance, and human perception. Performance-related factors include, but are not limited to, the speed with which a device executes system or user software, the rate of updates to the screen, processing time in response to user input, the variation in performance over time, and others.

Because performance related factors are critical to the user experience that a computing device can deliver, it is important to be able to quantify performance by way of measurement. When a performance measurement is performed using a computing device, the computing device typically executes a system software which in turn executes a performance testing software. The computing device generally contains a data store and retrieve mechanism where performance-related measurement data is stored during testing. The performance-related measurement is generally accessed by on-device or off-device data processing mechanism for processing and analysis of the performance data after completion of the performance testing software.

While the performance testing software is running, the measurement instrumentation software collects the performance measurement data and stores it for later use via the data store and retrieve mechanism. Once the performance measurement has finished, the data processing mechanism will retrieve the performance measurement data from data store and retrieve mechanism and process it to extract the relevant performance-related information. Generally, the higher the desired measurement accuracy, the longer the performance testing software is run which in turn leads to the larger the amount of performance data that needs to be captured.

A key aspect of performance analysis is to generate valid data while at the same time avoiding to disturb the measurement at runtime. Any overhead imposed by the measurement itself should be kept small. Specifically, the overhead of the measurement instrumentation software, the data store and retrieve mechanism, and the data processing mechanism should be small or negligible relative to the effort of the performance testing software. In general, this means that runtime processing should be simple and involve only very small amounts of code and data storage and retrieval should be located in low-latency storage on the device.

In constrained environments, such as mobile devices, processing and storage capabilities may be very limited. Therefore, performance measurements are subject to great restrictions. Unfortunately, in most mobile devices, measurement overhead must be kept to a minimum and in particular, only very simple processing and filtering of measurement data should be done at runtime. In addition, on-device data storage on mobile devices tend to be very limited and storage latency may be high. Consequently, traditional performance measurement methods do not map well onto constrained environments, or might not be applicable at all in constrained environments.

Accordingly, what is needed is a system and a method to measure performance of mobile devices while utilizing lesser amounts of processing power and data storage space.

SUMMARY OF THE INVENTION

Broadly speaking, the present invention is an system and a method for intelligent and powerful determination of the performance of mobile devices while utilizing lesser amounts of processing power and data storage space. It should be appreciated that the present invention can be implemented in numerous ways, such as a process, an apparatus, a system, a device or a method on a computer readable medium. Several inventive embodiments of the present invention are described below.

In one embodiment, a method for testing performance of a constrained resources computing device (CRCD) is provided which includes determining that a data sample was generated and generating a time stamp corresponding to when the data sample was generated. The method also includes determining a defined time interval corresponding to the time stamp and incrementing a counter associated with the defined time interval corresponding to the time stamp.

In another embodiment, a computer readable media having program instructions for testing performance of a constrained resources computing device (CRCD) is provided. The computer readable media includes program instructions for determining that a data sample was generated and program instructions for generating a time stamp corresponding to when the data sample was generated. The computer readable medial also includes program instructions for determining a defined time interval corresponding to the time stamp and program instructions for incrementing a counter associated with the defined time interval corresponding to the time stamp.

In yet another embodiment, a system for testing performance of a constrained resources computing device (CRCD) is provided which includes a testing application which generates data and a measurement harness that communicates with the testing application to receive a notification when data has been generated. The measurement harness also divides a runtime of the testing application into a plurality of time periods, generates a time stamp corresponding to when the data was generated, and associates the time stamp with one of the plurality of time periods.

The advantages of the present invention are numerous. Specifically, the present invention enables the determination of computing system performance by dividing the runtime during which performance software is executed, into defined time intervals. Each of the defined time intervals may be associated with performance measurement data generated in the time periods that fall within the corresponding defined time intervals. Instead of keeping all of the performance measurement data, a counter may be used that defines a number of data samples that fall within the corresponding ones of the plurality of defined time intervals. This methodology enables the reduction and the sorting of all data samples at runtime in an efficient and space-saving manner while preserving the desired performance measurement accuracy.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 2 illustrates a graph and a table showing the usage of defined time intervals to store data sample information in accordance with one embodiment of the present invention.

DETAILED DESCRIPTION

The following embodiments describe an apparatus and method for intelligent and powerful determination of the performance of mobile devices. It will be obvious, however, to one skilled in the art, that the present invention may be practiced without some or all of these specific details. In other instances, well known process operations have not been described in detail in order not to unnecessarily obscure the present invention.

User experience is determined by certain aspects and limitations of human perception. An event is perceived by the user as being instantaneous if it occurs within 50 ms of the event trigger. In addition, multiple events are perceived as continuous if their occurrence is spaced no more than 50 ms apart from each other. Most performance measurement data is time-based meaning that each data value is measured at a specific point in time and can be represented as a value pair of measurement value and time stamp which may be known as a data sample. Based on the fact that human perception treats events that lie within 50 ms of each other as continuous, for the purpose of measuring the effect of performance on the user experience a resolution better than 50 ms is not necessary in capturing performance-related data samples.

In general terms, the present invention may use a collection of ms "buckets" which can each hold multiple data samples. In one embodiment, a "bucket" may be associated with a particular defined time interval such as, for example, a 50 ms time period. Therefore, each data sample may be assigned to a particular bucket depending on the time stamp of the data sample. Consequently, instead of collecting and storing all of the data samples, a numeric value can be incremented for each generated data sample associated with the particular defined time interval. As a result, a single numeric value representing a number of data samples may be utilized and stored for each one of a plurality of time periods instead of storing all of the data samples received during that time period. In such a way, less processing power and less storage space are utilized since less data need be processed and stored. Once the sampling is completed, the present invention may statistically process the sampled data. It should be understood that any suitable type of statistical analysis of data as known to those skilled in the art may be utilized. It should also be appreciated that the following embodiments are exemplary in nature and any suitable operations may be utilized that are consistent with the apparatus and methods described herein.

Figure 1A:
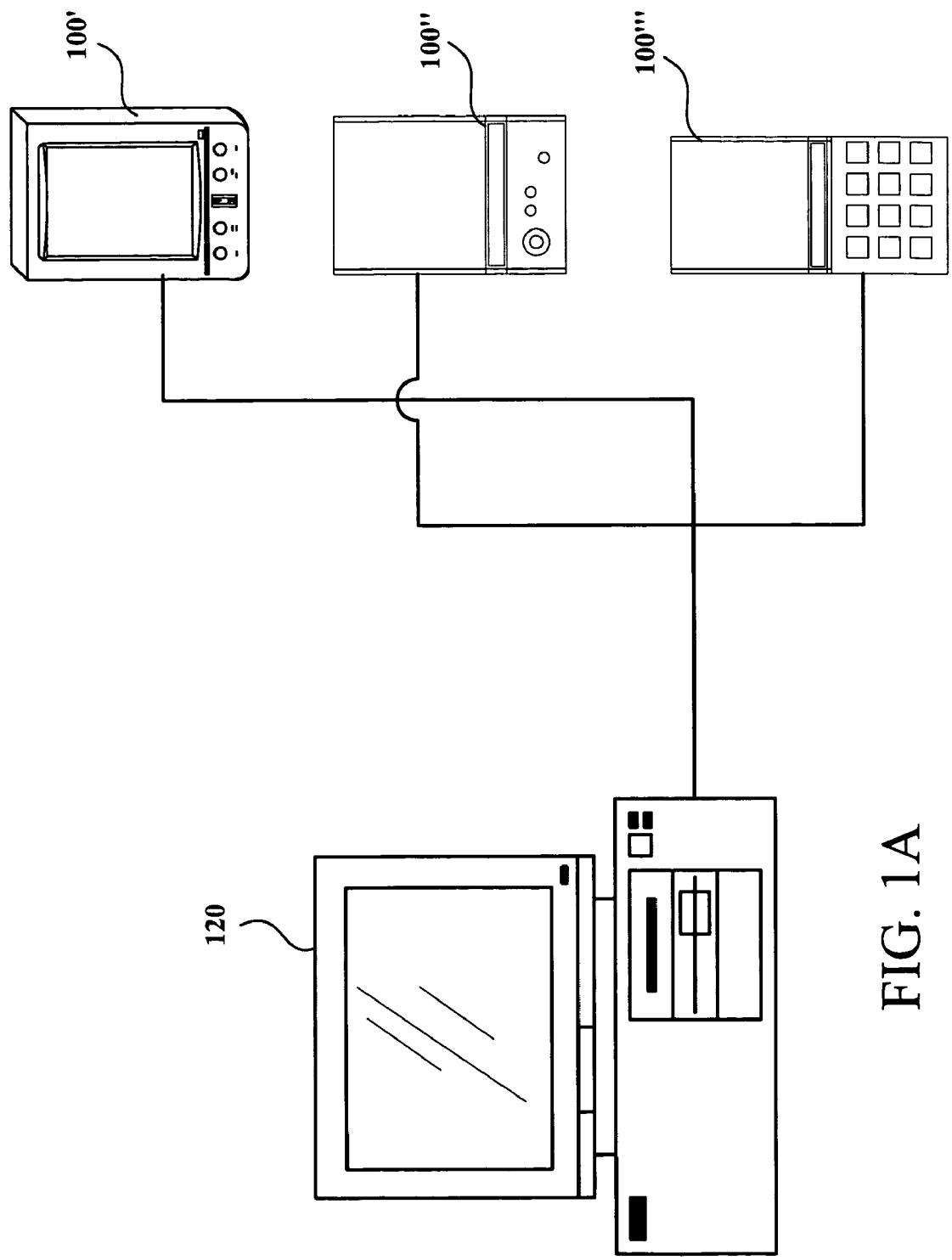
FIG. 1A shows a macroscopic view of a testing system in accordance with one embodiment of the present invention.

FIG. 1A shows a macroscopic view of a testing system in accordance with one embodiment of the present invention. The testing system, in one embodiment, includes constrained resources computing devices (CRCD) 100', 100", and 100'". In one exemplary embodiment, the CRCD 100' is a personal digital assistant, the CRCD 100" is a handheld computer unit, and a the CRCD 100'" is a cellular telephone. An exemplary CRCD 100 is described in further detail in reference to FIG. 1B. The methodologies described herein can be utilized to determine performance of the CRCD's such as those, for example, as shown in FIG. 1A without the need for high processing power and large storage capabilities. Such CRCD's can be connected to a more powerful computer such as a testing back-end computer 120 which can be used to process the data from the CRCD 100 to determine performance of the CRCD 100. An exemplary testing back-end computer is described in further detail in reference to FIG. 1B.

Figure 1B:
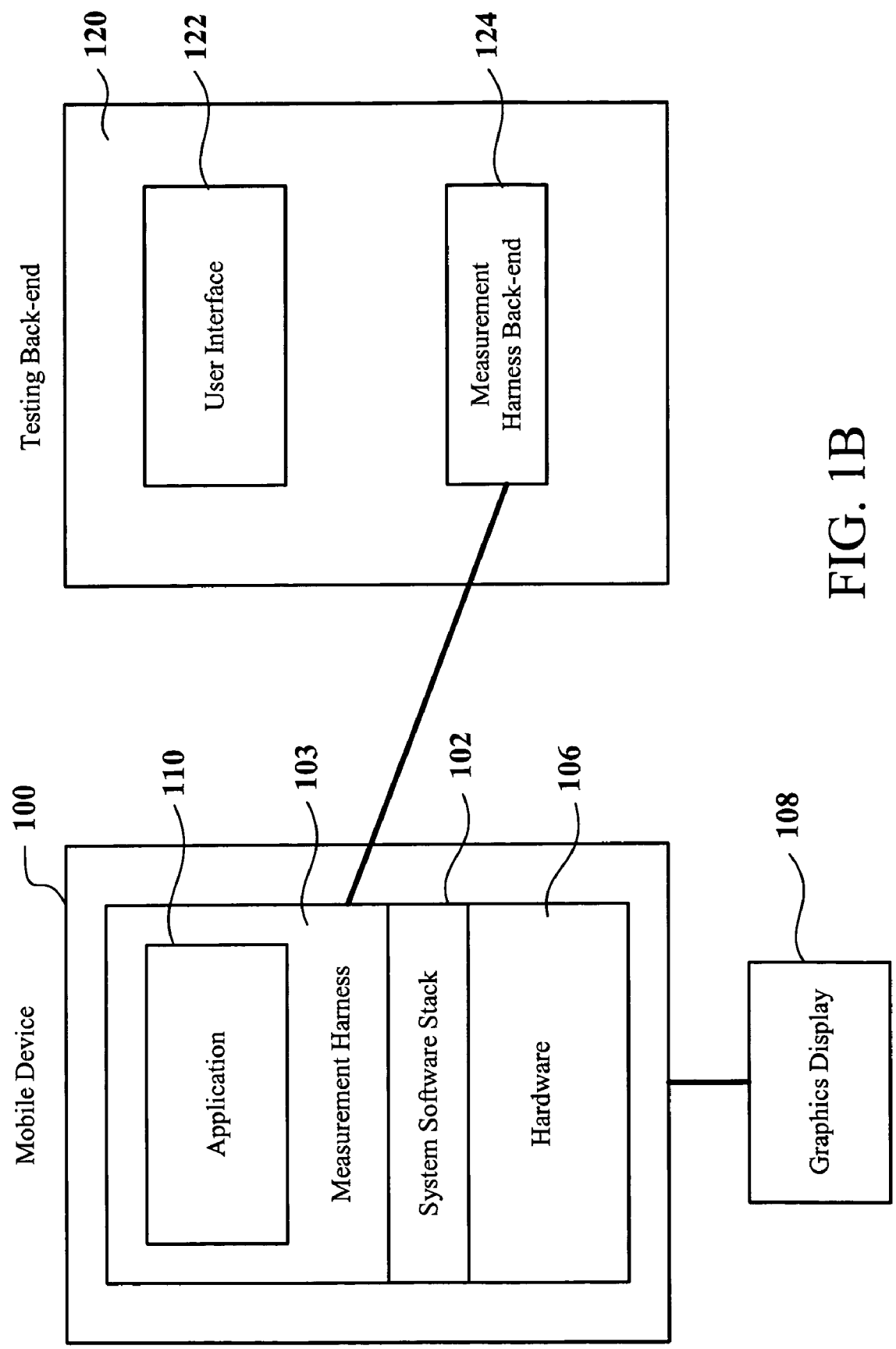
FIG. 1B illustrates a block diagram of the testing system including the constrained resources computing device (CRCD) showing exemplary functional components in accordance with one embodiment of the present invention.

FIG. 1B illustrates a block diagram of the testing system including the constrained resources computing device (CRCD) 100 showing exemplary functional components in accordance with one embodiment of the present invention. It should be appreciated that the CRCD 100 may be any suitable type of mobile computing device such as, for example, a personal digital assistant, a handheld computer unit, a cellular telephone, etc. that may have limited computing resources. Limited computing resources can include limited processing power, limited storage capacity, etc. Some exemplary embodiments of the CRCD 100 are shown above in reference to FIG. 1A as CRCD's 100', 100", 100'".

In one embodiment, the CRCD 100 may include hardware 106, system software stack 102, and a measurement harness 103 that can initiate the running of a testing application 110. The hardware 106 may be any suitable type of hardware component of the CRCD 100 which would be used in the processing data samples, such as for example data packets or frames being processed during an graphics display on the CRCD 100. In one embodiment, the hardware 106 may include a central processing unit CPU, timers, memory (random access memory (RAM), read only memory (ROM), flash, EEPROM, etc.), input/output subsystems, input devices (mouse, keyboard, touchscreen, etc.), output devices (audio, display, network, etc.), persistent storage (memory cards, disks, etc.), power supply, battery, etc.

It should be appreciated that although data samples are utilized herein for exemplary purposes, the methods described herein may collect data by receiving any suitable kind of performance-related event and by recording the corresponding time stamp and any suitably related data. In one embodiment, frames may be used for generation of animated sequences on a display screen. The software stack 102 may be any suitable type of software such as, for example, low-level control software (e.g., BIOS), kernel, kernel extension modules, device drivers, libraries, operating system software or operating system-related software (such as, for example, Java virtual machine) which may be involved in the processing of data samples. The CRCD 100 may display data samples such as, for example, frames on a graphics display 108. The graphics display 108 can be any suitable component such as, for example, a display screen, that can be a part of the CRCD 100 or connect to CRCD 100. The graphics display 108, in one embodiment, can show or display any suitable types of graphics such as, for example, video, streaming video, movies, graphics in a computer game, animation sequences, etc.

The testing system can also include the testing back-end computer 120. The testing back-end computer 120 may be any suitable computing device that has computing resources to process testing data received from the CRCD 100. In one embodiment, the testing back-end 120 may include a user interface 122 and a measurement harness back-end 124. The testing back-end computer 120 and the CRCD 100 may be connected in any suitable manner than enables communication of data.

In an exemplary testing operation, a user can start testing by inputting a testing command into a user interface 122 in the back-end testing computer 120. It should be appreciated that the user interface 122 may be any suitable computing interface that can communicate data to and from a user. In one embodiment, the user interface may be a graphical user interface through which the user can access a testing menu which shows what testing applications are available to be utilized. Through the user interface 122, the user can select a particular testing application to be run. In one embodiment, the measurement harness back-end 124 can receive the instructions from a user through the user interface 122. The measurement harness back-end 124 may be software running on the testing back-end computer 120 that can communicate with the measurement harness 103 in the CRCD 100.

The instruction to start a particular testing application may be transmitted from the measurement harness back-end 124 to the measurement harness 103 in the CRCD 100. It should be appreciated that the measurement harness 103 may be any suitable type of code or program that can implement operations/applications that are consistent with the methodologies described herein. It should be appreciated that the measurement harness 103 may be any suitable code/software that can test the CRCD 100's performance as described in the methodologies described herein. In one embodiment, the measurement harness 103 is software/code that can determine how many data samples are generated in a certain time period. Once the measurement harness 103 receives instructions to start testing using a certain testing application, the measurement harness 103 causes the loading and running of the testing application 110. The measurement harness 103 can then begin collecting data to determine the performance of the CRCD 100. In one embodiment, a video or graphics may be displayed on the display screen 108 and the frames comprising the video or graphics may be analyzed for CRCD 100 performance.

The testing application 110, in one embodiment, begins the testing by generating the data samples (e.g. frames) to be shown by the CRCD 100. The testing application 110 determines completion of generation of a data sample (e.g. frames) and notifies the measurement harness 103 which notes the time of measurement ($T_m$). The measurement harness 103 may divide the runtime of the testing application 110 into a plurality of time periods (also known as a plurality of defined time intervals). It should be appreciated that the plurality of time periods may depend on the type of data to be collected and the human perception factors involved. Therefore, depending on the testing applications utilized and the type of perceptions being measured, the time period may be any suitable length of time. In one embodiment, each of the plurality of time periods may be between about 50 ms and about 200 ms in length of time. In another embodiment, each of the plurality of time intervals may be about 50 ms.

The measurement harness 103, in one embodiment, associates the time of measurement (also known as time stamp) with a corresponding one of a plurality of time periods (also known as a plurality of defined time intervals). In one embodiment, each one of the plurality of time periods may be referred to as a bucket.

In one embodiment, once the measurement harness 103 receives notification of the data sample generation and generates a time stamp associated with the data sample, the measurement harness 103 computes the current bucket number. The current bucket number may be determined by subtracting the start time of testing (e.g., time stamp of an initial data sample) from the time stamp (e.g., time of measurement) of a current data sample and dividing that number by the length of each of the plurality of time periods. In one embodiment, the integer of the result of the division is the current bucket number. Every time a data sample is completed, the measurement harness 103 may increment a data sample number (i.e. the number of data samples generated/received during a particular time period) associated with a corresponding one of the defined time interval (e.g., bucket). In one embodiment, every bucket may begin with a data sample number count of 0 to signify that the bucket starts the test empty. The current bucket can be updated by incrementing a data sample number associated with the bucket. If there are more data samples to process, the application 110 begins the processing again with the generation of another data sample. This may continue until a plurality of data samples are generated. By measuring a plurality of data samples over time, data such as, for example, frame rate/sec may be analyzed.

In one embodiment where frame rate/sec is analyzed, if a frame is displayed on a screen once very 50 ms then the user may perceive the display as taking place smooth enough to not distinguish the drawing of each frame. Therefore, by using 50 ms buckets in the methodologies described herein, one can determine if the frame rate is large enough to generate a pleasant viewing experience for the user. Consequently, one just has to determine if a frame has been completed within a 50 ms period to determine preferable performance of the CRCD 100 in a graphics display usage. This is the reason why only the number of frames per 50 ms may be used and stored. It should be appreciated that although 50 ms is used as an exemplary time length of the defined time interval, any suitable number lower or higher that 50 ms may be used that are consistent with the methodologies described herein.

FIG. 2 illustrates a graph and a table showing the usage of defined time intervals to store data sample information in accordance with one embodiment of the present invention. In one embodiment, the graph 160 shows 50 ms intervals of a testing runtime. Each of the 50 ms time intervals include a numeric value which corresponds to the number of data samples that were generated during that time frame. In one embodiment, a starting time as shown on graph 160 is actually the time an initial data sample was generated. As shown in the exemplary embodiment of graph 160, from 0 to 49 ms, 3 data samples were generated. From 50 ms to 99 ms, 3 data samples were generated. From 100 ms to 149 ms, 4 data samples were generated. From 150 ms to 199 ms, 3 data samples were generated. From 200 to 249 ms, 3 data samples were generated. From 250 to 299 ms, 5 data samples were generated. Therefore, by just counting the number of data samples generated per 50 ms time period, in this example, only 6 numeric values need be stored instead of storing all of the 20 data samples which may each have a large amount of data.

Table 180 shows when each data sample was generated by the testing application 110 as described above in FIG. 1B. It should be appreciated that table 180 is only exemplary in nature to show how numbers of data samples can be associated with 50 ms containers (e.g., buckets) of graph 160. The first 3 data samples were generated at 5 ms, 20 ms, and 40 ms after an initial data sample (generated before data sample #1) was generated to start the testing. Therefore, the first 3 data samples are associated with the first 50 ms bucket. Consequently a numeric value such as 3 may be associated with the first bucket signifying 3 data samples generated during that timeframe.

The $4^{th}$ through the $6^{th}$ data samples were generated at 52 ms, 59 ms, and 89 ms after the initial data sample (generated before data sample #1) was generated to start the testing. Therefore, the $4^{th}$ through the $6^{th}$ data samples are associated with the second 50 ms bucket (50 ms to 99 ms). As a result a numeric value such as 3 may be associated with the second bucket signifying 3 data samples generated during that timeframe.

The $7^{th}$ and the $8^{th}$ data samples were generated at 105 ms and 130 ms. Therefore, the $7^{th}$ and the $8^{th}$ data samples are associated with the third 50 ms bucket (100 ms to 149 ms). As a result a numeric value such as 2 may be associated with the third bucket signifying 2 data samples generated during that timeframe. One embodiment of the methodology of using buckets to store data sample information is described in further detail in reference to FIG. 5.

It should be appreciated that although FIG. 2 shows the time stamp of data samples being measured from the initial data sample generation, other ways of determining time stamps and determining the corresponding defined time intervals may be utilized. In another embodiment, the time stamps and the defined time intervals may be measured from the beginning of the testing application. In such a case, there may be empty buckets before the initial data sample is generated.

Figure 3:
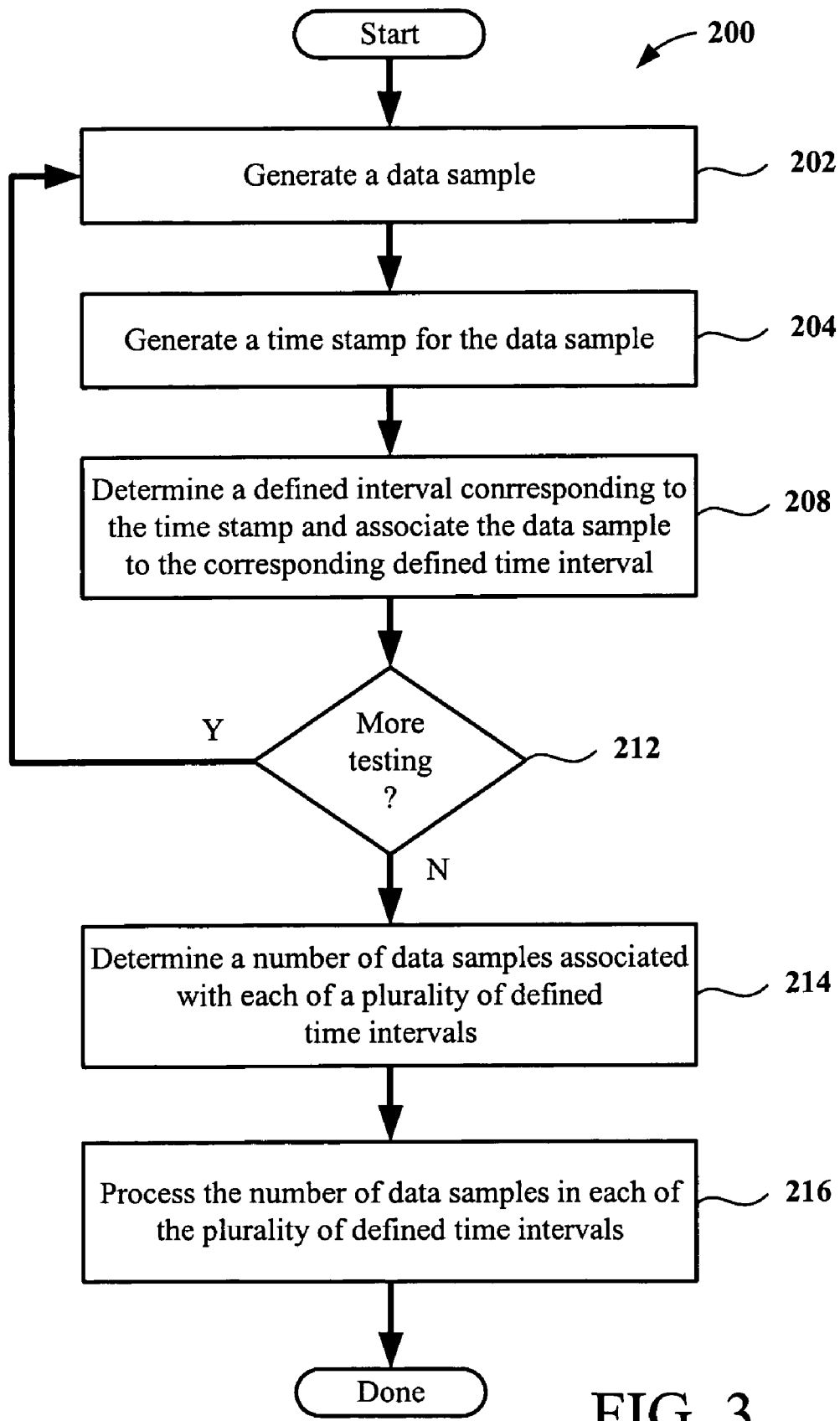
FIG. 3 shows a flowchart which defines a method for determining the performance of the CRCD in accordance with one embodiment of the present invention.

FIG. 3 shows a flowchart 200 which defines a method for determining the performance of the CRCD 100 in accordance with one embodiment of the present invention. It should be understood that the processes depicted in the flowchart 200 may be in a program instruction form written on any type of computer readable media. For instance, the program instructions can be in the form of software code developed using any suitable type of programming language. For completeness, the process flow of FIG. 3 will illustrate an exemplary process whereby the performance of the CRCD 100 may be determined by utilizing low levels of processing power and storage space.

The method begins with operation 202 generates a data sample. It should be appreciated that data samples may be any suitable type of data such as, for example, data packets, frames of a video, etc. In one embodiment, the testing application 110 generates the data sample used for testing. After operation 202, the method proceeds to operation 204 where a time stamp for the data sample is generated. In one embodiment, (as discussed in further detail in reference to FIG. 1B), the measurement harness 103 receives notification from the application 110 that the data was generated and therefore generates the time stamp for that data. Operation 204 is described in further detail in reference to FIG. 4. Then the method advances to operation 208 which determines a defined time interval corresponding to the time stamp and associates the data sample to the corresponding defined time interval. Operation 208 is described in further detail in reference to FIG. 5. Then the method proceeds to operation 212 which determines whether there is more testing to be conducted. If operation 212 determines that more testing is to be conducted, the method repeats operations 202, 204, 208, and 212. If operation 212 determines that there is no more testing to be conducted, the method advances to operation 214 which determines a number of data samples associated with each of a plurality of defined time intervals. After operation 214, the method proceeds to operation 216 which processes the number of data samples in each of the plurality of defined time intervals. It should be appreciated that processing may be any suitable statistical analysis of the data such as, for example, determining means, medians, standard deviations, minimums, maximums, etc.

Figure 4:
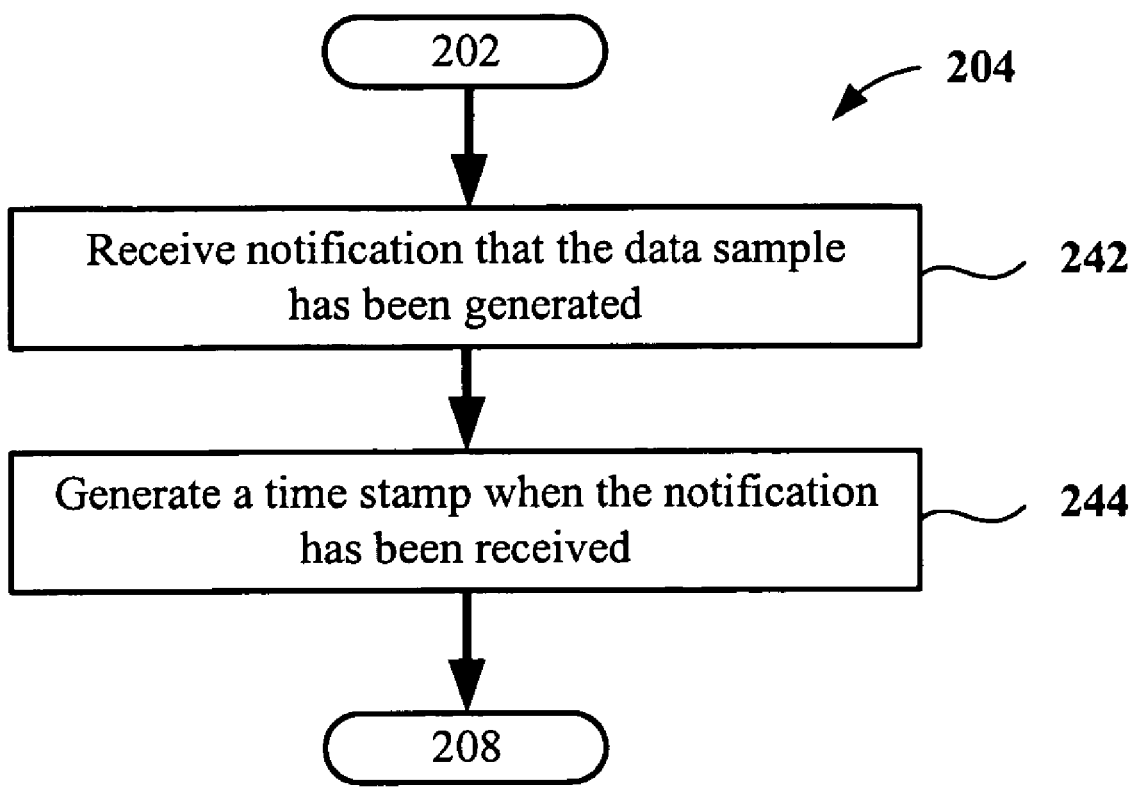
FIG. 4 illustrates a flowchart which defines the generation of a time stamp for the data sample in accordance with one embodiment of the present invention.

FIG. 4 illustrates a flowchart 204 which defines the generation of a time stamp for the data sample in accordance with one embodiment of the present invention. The flowchart 202 begins with operation 242 which receives notification that the data sample has been generated. In one embodiment, the measurement harness receives the notification from the testing application. In this way, the measurement harness can determine that a data sample was generated. After operation 242, the flowchart 202 moves to operation 244 which generates a time stamp when the notification has been received.

Figure 5:
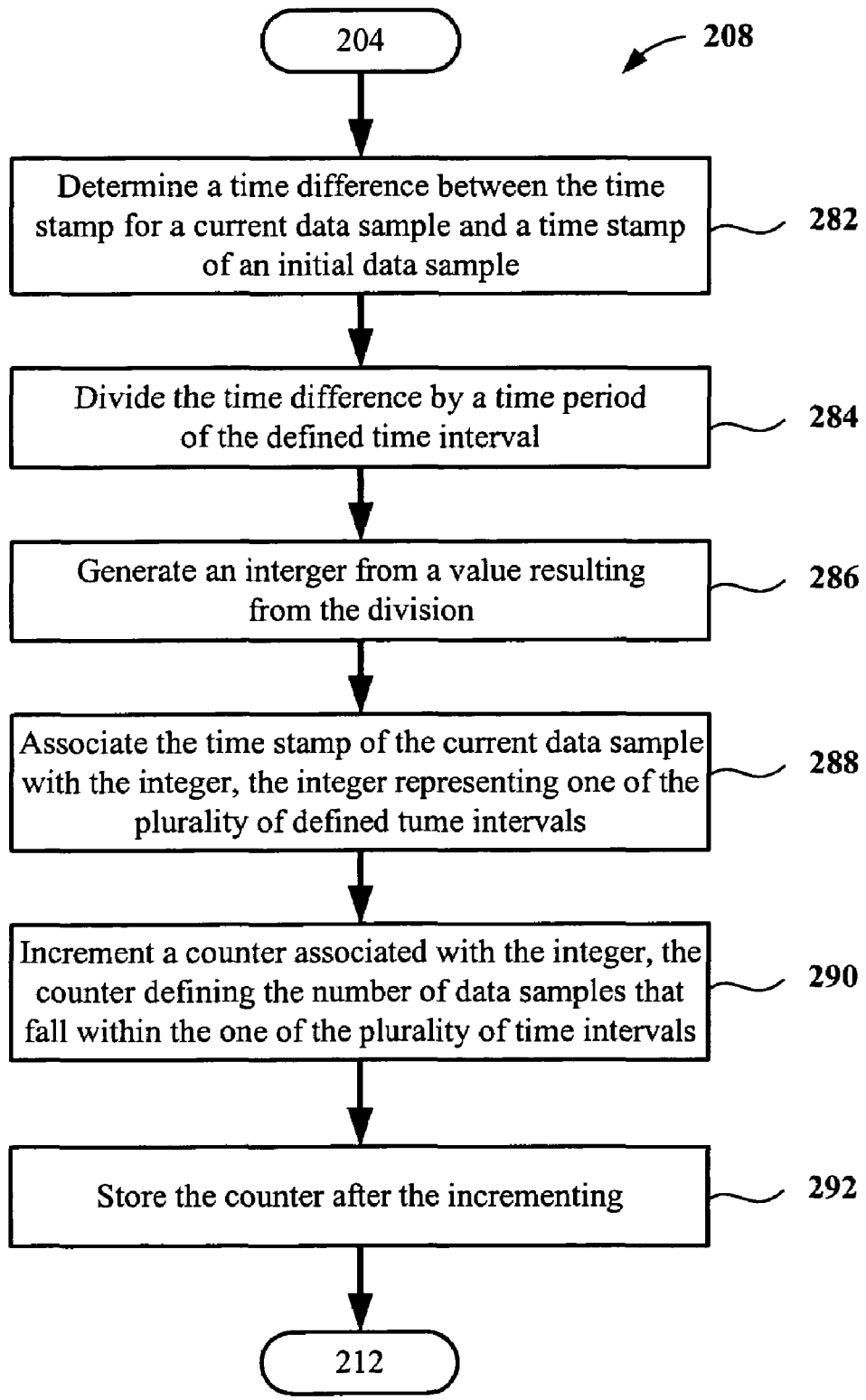
FIG. 5 shows a flowchart which defines the determining of a defined time interval corresponding to the time stamp and associating the data sample to the corresponding defined time interval in accordance with one embodiment of the present invention.

FIG. 5 shows a flowchart 208 which defines the determining of a defined time interval corresponding to the time stamp and associating the data sample to the corresponding defined time interval in accordance with one embodiment of the present invention. Flowchart 208 begins with operation 282 which determines a time difference between the time stamp for a current data sample and a time stamp of an initial data sample. Then the flowchart moves to operation 284 which divides the time difference by a time period of the defined time interval. Then the flowchart 208 moves to operation 286 which generates an integer from a value resulting from the division. After operation 286, the flowchart 208 proceeds to operation 288 which associates the time stamp of the current data sample with the integer, the integer representing one of the plurality of defined time intervals. Then the method advances to operation 290 which increments a counter associated with the integer, the counter defining the number of data samples that fall within the one of the plurality of time intervals. After operation 290, the flowchart 208 moves to operation 292 which stores the counter after the incrementing. It should be appreciated that the counter may be stored in any suitable manner such as, for example, in memory, in storage media, etc.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for testing performance of a constrained resources computing device (CRCD), comprising:
   a) determining that a data sample was generated, wherein the determining includes receiving a notification from a testing application that the data sample was generated;
   b) generating a time stamp corresponding to when the data sample was generated;
   c) defining a plurality of time intervals, each of the plurality of time intervals being of a size to enable human perception to perceive processing as substantially instantaneous when processing occurs during each of the plurality of time intervals;
   d) assigning the data sample having the time stamp to one of the plurality of time intervals, the time stamp of the data sample being analyzed to enable the assigning of the data sample to a corresponding time interval that can accept the data sample having the generated time stamp, wherein each of the plurality of time intervals defines a runtime of the testing application; and
   e) incrementing a counter associated with the defined time interval corresponding to the time stamp when the data sample is assigned to the defined time interval, wherein a memory within the CRCD is used in storing the counter representing the number of data samples generated for each of the defined time intervals, the counters from each of the plurality of time intervals used in performing statistical analysis of the data sample to determine the performance of the CRCD.

2. A method for testing performance of a constrained resources computing device (CRCD) as recited in claim 1, wherein a length of time of the defined time interval is between about 50 to about 200 ms in time.

3. A method for testing performance of a constrained resources computing device (CRCD) as recited in claim 1, wherein the data sample is a data packet.

4. A method for testing performance of a constrained resources computing device (CRCD) as recited in claim 1, wherein the data sample is one of a frame of graphics, an algorithm data, a user interface event processing data, a network data packet.

5. A method for testing performance of a constrained resources computing device (CRCD) as recited in claim 1, wherein the counter defines a number of data samples generated during the defined time interval.

6. A method for testing performance of a constrained resources computing device (CRCD) as recited in claim 1, wherein a length of time of the defined time interval is at most about 50 ms.

7. A method for testing performance of a constrained resources computing device (CRCD) as recited in claim 1, further comprising:
   determining a number of data samples associated with each one of a plurality of defined time intervals.

8. A method for testing performance of a constrained resources computing device (CRCD) as recited in claim 1, wherein the defined time interval is one of a plurality of time intervals, each one of the plurality of time intervals being between about 50 ms and about 200 ms.

9. A method for testing performance of a constrained resources computing device (CRCD) as recited in claim 1, further comprising:
   repeating operations a–e.

10. A computer readable media having program instructions for testing performance of a constrained resources computing device (CRCD), the computer readable media comprising:
    program instructions for determining that a data sample was generated, wherein the determining includes receiving a notification from a testing application that the data sample was generated;
    program instructions for generating a time stamp corresponding to when the data sample was generated;
    program instructions for defining a plurality of time intervals, each of the plurality of time intervals being 50 ms in size to enable human perception to perceive processing as substantially instantaneous when processing occurs during each of the plurality of time intervals;
    program instructions for assigning the data sample having the time stamp to one of the plurality of time intervals, the time stamp of the data sample being analyzed to enable the assigning of the data sample to a corresponding time interval that can accept the data sample having the generated time stamp each of the plurality of time intervals defines a runtime of the testing application; and program instructions for incrementing a counter associated with the defined time interval corresponding to the time stamp when the data sample is assigned to the defined time interval, wherein a memory within the CRCD is used in storing the counter representing the number of data samples generated for each of the defined time intervals, the counters from each of the plurality of time intervals used in performing statistical analysis of the data sample to determine the performance of the CRCD.

11. A computer readable media as recited in claim 10, wherein the data sample is a data packet.

12. A computer readable media as recited in claim 10, wherein the data sample is one of a frame of graphics, an algorithm data, a user interface event processing data, a network data packet.

13. A computer readable media as recited in claim 10, wherein the counter defines a number of data samples completed within the defined time interval.

* * * * *